Nov. 11, 1924.
E. J. QUINN
1,514,789
FILM WINDING ATTACHMENT FOR CAMERAS
Filed Jan. 29, 1924  4 Sheets-Sheet 1
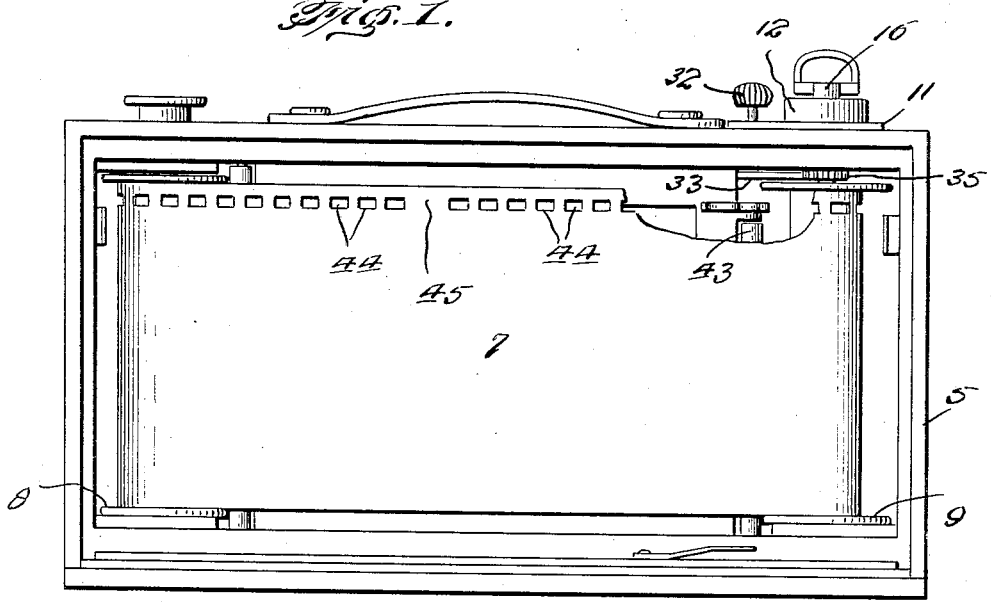
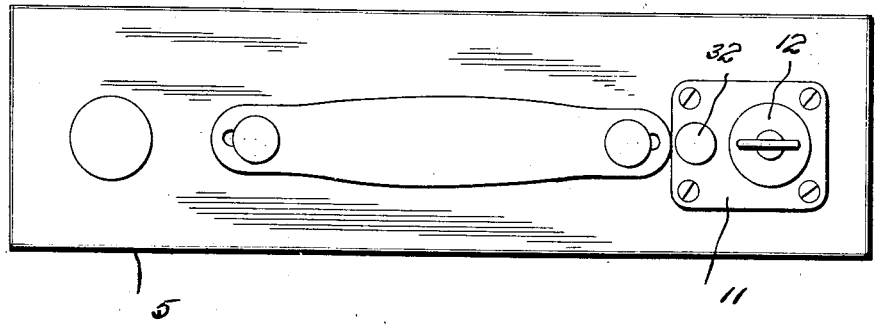

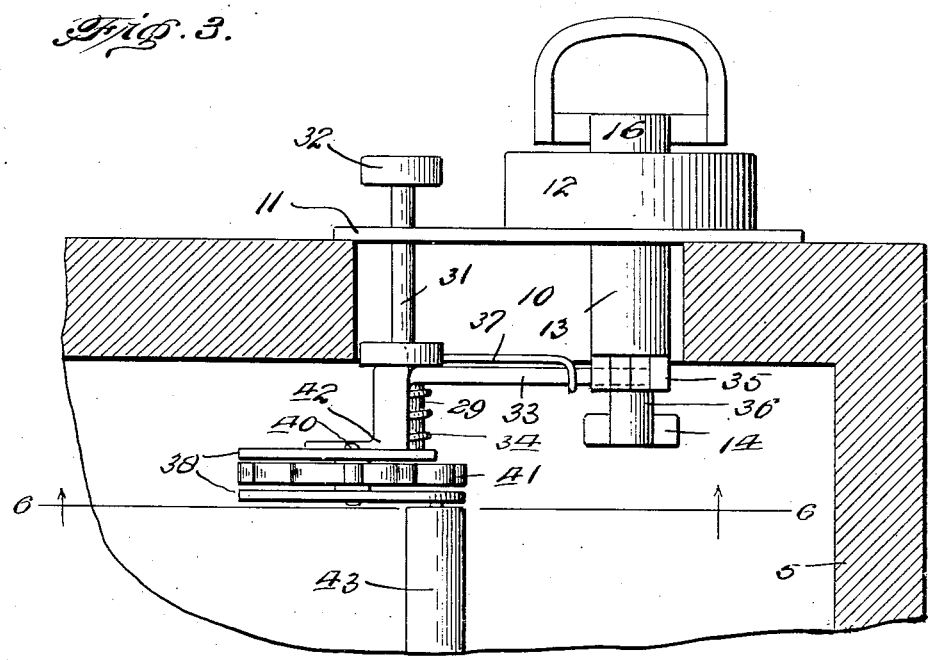
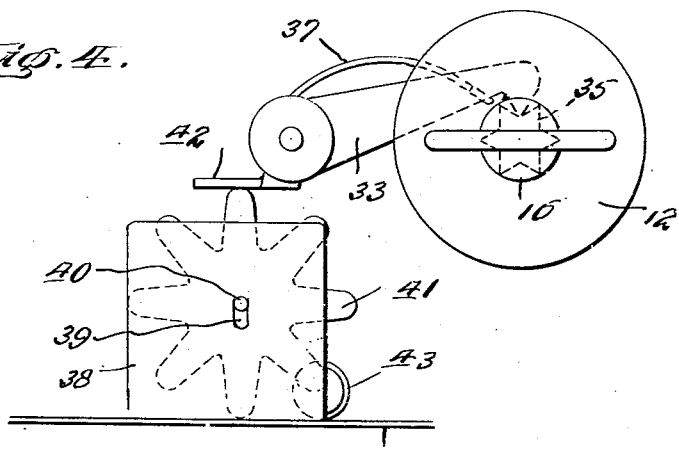

Nov. 11, 1924. 1,514,789
E. J. QUINN
FILM WINDING ATTACHMENT FOR CAMERAS
Filed Jan. 29, 1924 4 Sheets-Sheet 3
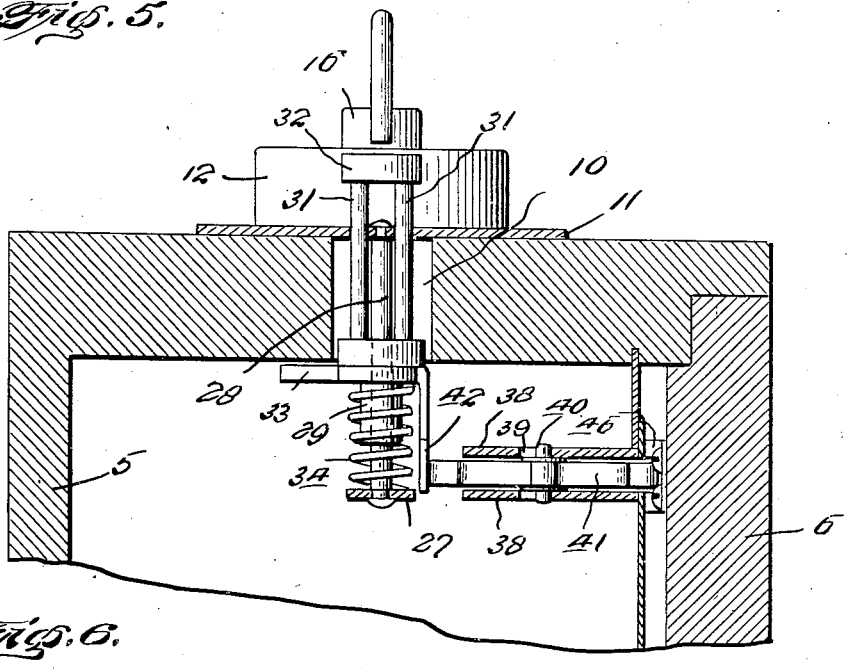
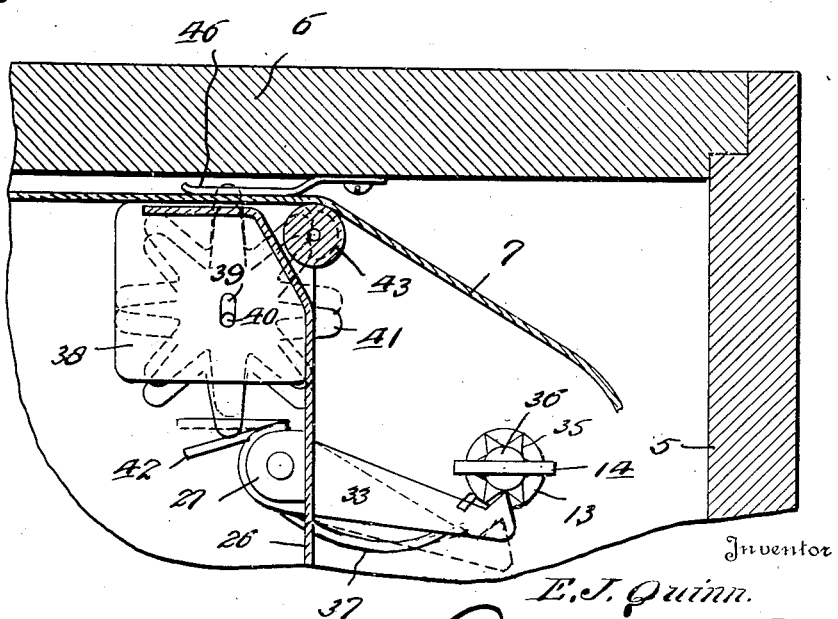
Witness.
F. C. Gibson.
Inventor
E. J. Quinn.
By Clarence A. O'Brien
Attorney Nov. 11, 1924.
E. J. QUINN
1,514,789
FILM WINDING ATTACHMENT FOR CAMERAS
Filed Jan. 29, 1924   4 Sheets-Sheet 4
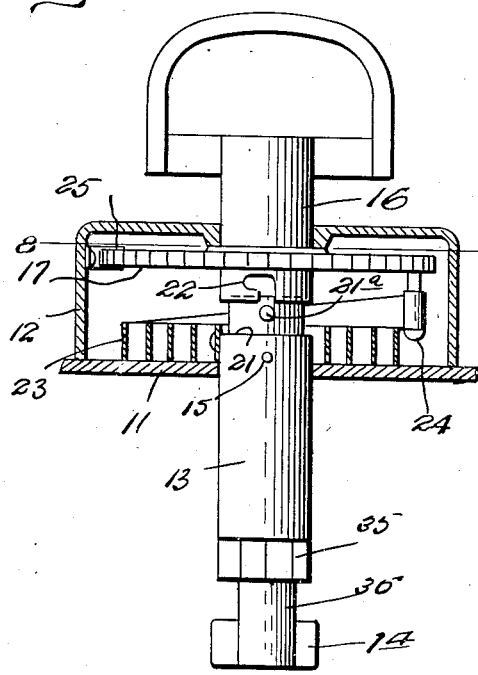
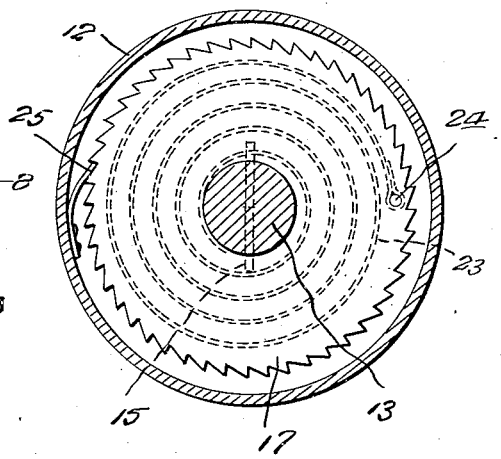
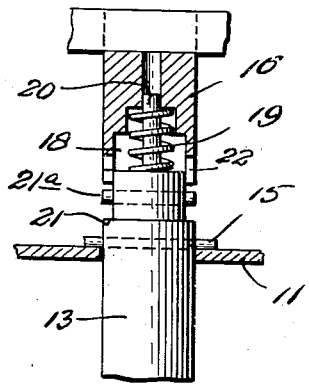
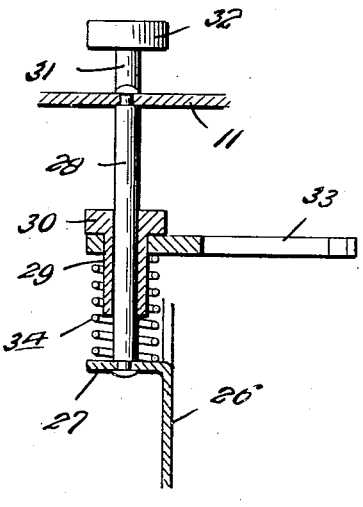
Witness.
F. C. Gibson.
Inventor
E. J. Quinn.
By Clarence O'Brien
Attorney Patented Nov. 11, 1924.

1,514,789

UNITED STATES PATENT OFFICE.

EDWARD J. QUINN, OF ROANOKE, VIRGINIA.

FILM-WINDING ATTACHMENT FOR CAMERAS.

Application filed January 29, 1924. Serial No. 689,271.

*To all whom it may concern:*

Be it known that I, EDWARD J. QUINN, citizen of the United States, residing at Roanoke, in the county of Roanoke and State of Virginia, have invented certain new and useful Improvements in Film-Winding Attachments for Cameras, of which the following is a specification.

This invention relates to camera attachments, and has particular reference to a mechanism for advancing the film of a roll holding camera.

The primary object of the invention is to provide novel and simple means for accurately advancing the film of a roll holding camera for a desired distance in a highly convenient and expeditious manner.

Another object of the invention is to provide mechanisms for control by movement of and the form of a film, so that proper positioning of successive portions of the film for exposure will be assured, without the necessity of any attention on the part of the operator.

A further object of the invention is to provide a mechanism of the above kind, wherein the film to be exposed will be automatically fed and stopped for successive exposures after depression and release of a control button or the like, thereby eliminating the necessity of the manual and careful rotation of the film winding spool of feeding the film after each exposure.

Still another object of the invention is to provide means having the above characteristics and which are simple, strong, durable and inexpensive to manufacture.

Other objects will become apparent as the nature of the invention is better understood, and the same consists in the novel form, combination, and arrangement of parts hereinafter more fully described, shown in the accompanying drawings and claimed.

In the drawings, wherein like reference characters indicate corresponding parts throughout the several views:

Figure 1 is a rear elevational view of a roll holding camera with the back wall thereof removed, and provided with a film and film advancing mechanism constructed in accordance with the present invention.

Figure 2 is a top plan view of the device shown in Figure 1.

Figure 3 is an enlarged fragmentary vertical sectional view of a right hand end portion of the device shown in Figure 1.

Figure 4 is an enlarged detail plan view, showing elements of the winding and stopping mechanism.

Figure 5 is a transverse sectional view of the device shown in Figure 3.

Figure 6 is a horizontal sectional view, taken substantially upon the line 6—6 of Figure 3.

Figure 7 is an enlarged sectional detail view, showing the elements for turning the winding spool, and adjacent parts.

Figure 8 is a horizontal sectional view, taken on the line 8—8 of Figure 7.

Figure 9 is an enlarged fragmentary detail view, partly in elevation, and partly in section, of the winding key and spool turning element, and Figure 10 is a view similar to Figure 9, showing the locking element and its releasing means with associated parts.

Referring more in detail to the drawings, 5 indicates the casing of an ordinary roll holding camera that is provided with a removable back wall 6. across which the film 7 is adapted to be moved from a spool 8 removably held, in a well known manner, within a compartment at one end of the casing 5, to another spool or winding spool 9 removably held in a compartment at the other end of the casing 5, the portion of the film 7 between the spools 8 and 9 being positioned for exposure as is well known and understood in the art.

In accordance with the present invention, the top wall of the casing 5 is provided with an opening as at 10, (see Figure 3) above and extending inwardly of the winding spool 9, and this opening is closed by means of a cover plate 11, upon the outer end portion of which is fixed an inverted substantially cup-shaped spring casing 12, the plate 11 thereby forming the bottom of the casing 12, as shown clearly in Figure 7. The plate 11 is provided with an opening centrally of the casing 12, in which is rotatably journalled the upper end of a shaft section 13, which constitutes an element operable for turning the winding spool 9, said shaft section 13 having the usual clutch element 14 upon the lower end thereof adapted for engagement in the upper end of the winding spool 9 in a well known manner. The shaft section 13 is vertically slidable in the opening of the plate 11 and is held against moving downwardly through said opening beyond a predetermined extent by means of a cross pin 15 that extends transversely through the shaft section 13 and rests upon the upper surface of the plate 11 adjacent the opening in the latter. The top wall of the casing 12 is provided with a central opening in which is journalled the stem of a winding key 16 which is also vertically movable or slidable in said opening and has a ratchet wheel 17 secured thereon upon the lower end portion of the same within the upper portion of the casing 12 as shown in Figure 7. As shown in Figure 9, the lower end of the stem 16 of the winding key is provided with a socket 18, into which normally partially projects the reduced upper end portion of the shaft section 13, the winding key and shaft section 13 being normally separated by means of a spring 19 interposed between the same within the socket 18 and preferably encircling a guide pin 20 fixed to the end of the shaft section 13 and projecting upwardly into a central passage through the stem 16. The reduction of the diameter of the upper end portion of shaft section 13 produces an annular shoulder for limiting the movement of the key stem 16 downwardly onto the shaft section 13 to a proper position wherein a cross pin 21 carried by the shaft section 13 is horizontally aligned with the horizontal laterally extending portion of each of a pair of bayonet slots provided in opposite sides of the lower end portion of said winding key stem 16.

Arranged within the lower portion of the casing 12 is a coiled spring 23, the inner end of which is suitably fastened to the upper end of the shaft section 13, and the outer end of which is attached to a depending pin 24, fixed to the marginal portion of the ratchet wheel 12. Attached to the side of the casing 12 is a pawl 25 that is constantly in engagement with the teeth of the ratchet wheel 17 for preventing rotation of the latter and the winding key in one direction.

From the construction described, it is apparent that the winding key 16 may be depressed and then partially rotated, for engaging the pin 21ª in the bayonet slot 22, so as to couple the shaft section 13 to said winding key, whereupon the shaft section 13 may be raised by pulling outwardly upon the winding key. The winding spool 9 may now be inserted, after which the shaft sections 13 and winding key 16 are forced inwardly so as to clutch the inner or lower end of said shaft section 13 to the adjacent end of the winding spool. The winding key is then partially rotated in a reverse direction to disengage the pin 21ª from the bayonet slot 22, whereupon the winding key is automatically forced upwardly by means of the spring 19 so as to allow the spring 23 to operate to rotate the shaft section 13 in the proper direction for winding the film 7 upon the spool 9. Also, the spring 23 may be rewound when the winding key 16 is unclutched from the shaft section 13 as shown in Figure 7, by rotating the winding key and ratchet wheel 17 in the direction permitted by the pawl 25, it being of course necessary to prevent rotation of the shaft section 13 at this time, in a manner which will presently become apparent.

Arranged transversely of the casing 5, at the inner side of the compartment for the winding spool 9 is a plate 26, (see Figure 6) having an inturned horizontal lug or ear 27, arranged at the inner side of and spaced from the shaft section 13. A vertical guide rod 28 is arranged between and connects the plate 11 and ear 27, the ends of the rod 28 being riveted in openings of the plate 11 and ear 27, as shown in Figure 10, and vertically slidable upon said rod 28 is a sleeve 29, having an annular flange 30 upon the upper end thereof, to which are attached the lower ends of a pair of stems 31, that are arranged at opposite sides of the rod 28 as shown in Figure 5, and slidably disposed through suitable openings in the plate 11, a button or finger piece 32 being fixed upon the upper ends of said stems 31.

Hinged at one end for horizontal swinging movement upon the sleeve 29 is a hook shaped catch 33 (see Figures 3 and 5) against the under side of which is disposed one end of a compression spring 34, that encircles the sleeve 29 and rod 28, and that has its other lower end bearing against the under surface of the lug or ear 27 for thereby maintaining the stems 31 and buttons 32 in an elevated position, and for similarly elevating the sleeves 29 to which said stems 31 are fixed, as well as holding the catch 33 in a raised position in the same horizontal plane as the ratchet wheel 35 that is formed upon the lower portion of the shaft section 13, and spaced above the clutch element 14 by an intervening cylindrical reduced portion 36 of said shaft section 13. The catch 33 is so formed and positioned as to have its hooked end engage the teeth of the ratchet wheel 35, when said catch is swung toward the latter for holding the shaft section 13 against turning under the influence of the spring 23, but said catch 33 is normally yieldingly moved out of engagement with the ratchet wheel 35 by the means of a suitable spring 37, as indicated by dotted lines in Figure 6.

A pair of plates 38 are suitably mounted in fixed horizontal parallel spaced relation between the back wall 6 of the camera casing and the pivoted inner end of the catch 33 as shown in Figures 3, 4, 5, and 6, and these plates are provided with vertically aligned elongated slots 39 that extend transversely of the casing 5, and in which are slidably and rotatably journalled the opposite ends of the shaft 40 of a sprocket wheel 41. A lug or arm 42 is rigid with and projects inwardly from the inner end of the catch 33 in position to engage the inner teeth of the sprocket wheel 41, so that when the spring 37 disengages the catch 33 from the ratchet wheel 35, the arm 42 is moved toward the back wall 6 for urging the sprocket wheel 41 toward said back wall and toward the film 7 which passes between the back wall 6 and said sprocket wheel 41. A suitable guide roller 43 may be provided in a vertical position adjacent the back wall 6 of the camera casing, and over which the film 7 passes in moving to and being wound upon the winding spool 9. As shown in Figure 5, the arm 42 of the catch 33 not only extends inwardly but also extends downwardly or depends from the catch 33, so as to be in the proper horizontal plane to engage the sprocket wheel 41 which is positioned below or lower than the catch 33.

As shown in Figure 1, the film 7 is formed or provided with a plurality of series of sprocket slots 44 that are separated at intervals by unslotted portions as at 45, the slot 44 being in the same plane as the sprocket wheel 41 and spaced properly to be entered by the teeth of said sprocket wheel 41 when the latter is forced toward the film and the back wall 6 by means of the spring 37, through the catch 33 and arm 42. The film 7 is held toward the sprocket wheel 41 by means of a suitable spring 46 as shown in Figures 5 and 6, so as to prevent rearward depression of the film 7 when the unslotted portion 45 thereof encounters the sprocket wheel 41, and whereby it is assured that said unslotted portion 45 will cause forward displacement of the sprocket wheel 41 for causing the catch 33 to swing into engagement with the ratchet wheel 35 through the medium of the arm 42 and against the action of the spring 37.

When the catch 33 is thus held into engagement with the ratchet wheel 35, the shaft section 13 is effectively held against turning, so that the spring 23 may be rewound by turning the key 16 in the proper direction as allowed by the wall 25, when said key 16 is unclutched from the shaft section 13, as shown in Figure 7. It is of course to be understood that an unslotted portion 45 will be provided at the proper point at the starting point on the film 7 for determining the first exposure, and that such unslotted portions 45 are successively provided at the proper intervals to insure stopping of the films as the proper successive portions of the same are positioned for exposure.

In operation, assuming that the spring 23 has been wound and the film 7 extended to and attached to the winding spool 9 with the key 16 unclutched from the shaft section 13, and the clutch element 14 engaged with the winding spool 9, as well as the sprocket wheel 41 engaging an unslotted portion 45 of the film 7 for positioning the catch 33 to engage the ratchet wheel 35 so as to hold the shaft section 13 against turning, the operator will depress the button 32, so as to cause the catch 33 to be lowered out of engagement with the ratchet wheel 35 between the latter and the clutch element 14. As soon as the catch 33 is thus disengaged from the ratchet wheel 35, the spring 23 will act to turn the shaft section 13 in the proper direction for winding the film 7 upon the spool 9. The unslotted portion of the film quickly passes the sprocket wheel 41, and the button 32 is immediately released, so as to allow the spring 34 to again raise the catch 33 in the plane of the ratchet wheel 35. When the unslotted portion of the film thus passes the sprocket wheel 41, the latter is forced rearwardly, so that its teeth engage in the slots 44 of the film, through the action of the spring 47 and arm 42 of the catch 33 at which time said spring 37 will maintain the catch 33 in released position as shown by dotted lines in Figure 6, so as to not interfere with the rotation of the shaft section 13 under the influence of the spring 23. When the next succeeding unslotted portion 25 of the film 7 encounters the sprocket wheel 41, the next successive portion of the film will be in position for exposure, and as the film 7 cannot move rearwardly adjacent the sprocket wheel 41 due to the presence of the spring 46, said sprocket wheel 41 will be forced forwardly by the unslotted portion of the film, so as to swing the arm 42 and catch 33, against the action of the springs 37 for engaging said catch with the ratchet wheel 35, thus stopping rotation of the shaft section 13 and arresting movement of the film. To again move the film to position the same for exposure of the next succeeding portion of the film the button 32 is again depressed and the operation repeated as above described as many times as there are portions on the film for exposure.

The manner of removing the used film and replacing the same by an unused one is exactly the same as that heretofore practiced, except the clutching of the winding key 16 to the shaft section 13 as above outlined.

From the above description, it is believed that the construction and operation as well as the advantages of the present invention will be readily understood and appreciated by those skilled in the art, Minor changes may be made without departing from the spirit and scope of the invention as claimed.

What I claim as new is:

1. In a camera, a winding spool to hold a film having a plurality of series of sprocket slots separated at intervals by unslotted portions, an element operable for turning the winding spool in one direction, a normally inoperative element for locking the spool turning element, a movable toothed element normally arranged to engage with the film with its teeth in the sprocket slots to permit release of said locking element and adapted to be moved by the unslotted portions of the film to cause the locking element to move in one direction to lock the spool turning elements.

2. In a camera, a winding spool to hold a film having a plurality of series of sprocket slots separated at intervals by unslotted portions, an element operable for turning the winding spool in one direction, a normally inoperative element for locking the spool turning element, a movable toothed element normally arranged to engage with the film with its teeth in the sprocket slots to permit release of said locking element and adapted to be moved by the unslotted portions of the film to cause the locking element to move in one direction to lock the spool turning elements, and manually operable means to move the locking element in another direction to release the same from the spool turning element when an unslotted portion of the film is engaged by the toothed element.

3. In a camera, a winding spool to hold a film having a plurality of series of sprocket slots separated at intervals by unslotted portions, an element operable for turning the winding spool in one direction, a normally inoperative element for locking the spool turning element, a movable toothed element normally arranged to engage with the film with its teeth in the sprocket slots to permit release of said locking element and adapted to be moved by the unslotted portions of the film to cause the locking element to move in one direction to lock the spool turning elements, and yieldable means to normally move the toothed element toward the film and to disengage the locking element from the spool turning element.

4. In a camera, a winding spool to hold a film having a plurality of series of sprocket slots separated at intervals by unslotted portions, a rotatable shaft having means for removably clutching the same with said winding spool, spring means for rotating said shaft in one direction for causing winding movement of the spool, a catch for locking said shaft against turning, yieldable means for normally releasing said catch from said shaft, a sprocket wheel having teeth adapted to mesh with the sprocket slots of the film and operatively associated with the catch whereby the same is moved toward the film when said catch is released from said shaft, the operative connection between the sprocket wheel and the catch constituting means for engaging the catch with the shaft for preventing rotation of the latter upon shifting of the sprocket wheel in a direction away from the film by an unslotted portion of the latter.

5. In a camera, a winding spool to hold a film having a plurality of series of sprocket slots separated at intervals by unslotted portions, a rotatable shaft having means for removably clutching the same with said winding spool, spring means for rotating said shaft in one direction for causing winding movement of the spool, a catch for locking said shaft against turning, yieldable means for normally releasing said catch from said shaft, a sprocket wheel having teeth adapted to mesh with the sprocket slots of the film and operatively associated with the catch whereby the same is moved toward the film when said catch is released from said shaft, the operative connection between the sprocket wheel and the catch constituting means for engaging the catch with the shaft for preventing rotation of the latter upon shifting of the sprocket wheel in a direction away from the film by an unslotted portion of the latter, said spring means for turning said shaft embodying a winding key having means for preventing rotation of the same in one direction, means for detachably connecting said winding key to said shaft upon movement of the key toward the spool, and yieldable means interposed between the shaft and winding key for normally urging the latter away from the spool wherein the same is unclutched from the shaft.

6. In a camera, a winding spool to hold a film having a plurality of series of sprocket slots separated at intervals by unslotted portions, a rotatable shaft having means for removably clutching the same with said winding spool, spring means for rotating said shaft in one direction for causing winding movement of the spool, a catch for locking said shaft against turning, yieldable means for normally releasing said catch from said shaft, a sprocket wheel having teeth adapted to mesh with the sprocket slots of the film and operatively associated with the catch whereby the same is moved toward the film when said catch is released from said shaft, the operative connection between the sprocket wheel and the catch constituting means for engaging the catch with the shaft for preventing rotation of the latter upon shifting of the sprocket wheel in a direction away from the film by an unslotted portion of the latter, said spring means for turning said shaft embodying a winding key having means for preventing rotation of the same in one direction, means for detachably connecting said winding key to said shaft upon movement of the key toward the spool, yieldable means interposed between the shaft and winding key for normally urging the latter away from the spool wherein the same is unclutched from the shaft, said means for clutching the winding key to said shaft constituting means for causing movement of the shaft away from the spool when the winding key is manually moved away from the spool, whereby said spool may be removed from the camera.

7. In a camera, a winding spool to hold a film having a plurality of series of longitudinal marginal sprocket slots separated at intervals by unslotted portions, an element provided with ratchet teeth and operable for turning the winding spool in one direction, a normally inoperative element for engaging said ratchet teeth to lock the spool turning element, a movable sprocket wheel normally arranged to engage with the film with its teeth in the sprocket slot to permit release of said locking element and adapted to be moved by the unslotted portions of the film to cause the locking element to move in one direction to lock the spool turning element.

8. In a camera, a winding spool to hold a film having a plurality of series of longitudinal marginal sprocket slots separated at intervals by unslotted portions, an element provided with ratchet teeth and operable for turning the winding spool in one direction, a normally inoperative element for engaging said ratchet teeth to lock the spool turning element, a movable sprocket wheel normally arranged to engage with the film with its teeth in the sprocket slot to permit release of said locking element and adapted to be moved by the unslotted portions of the film to cause the locking element to move in one direction to lock the spool turning element, and manually operable means to move the locking element in another direction to release the same from the spool turning element when an unslotted portion of the wheel is engaged by the sprocket wheel.

9. In a camera, a winding spool to hold a film having a plurality of series of longitudinal marginal sprocket slots separated at intervals by unslotted portions, an element provided with ratchet teeth and operable for turning the winding spool in one direction, a normally inoperative element for engaging said ratchet teeth to lock the spool turning element, a movable sprocket wheel normally arranged to engage with the film with its teeth in the sprocket slot to permit release of said locking element and adapted to be moved by the unslotted portions of the film to cause the locking element to move in one direction to lock the spool turning element, and manually operable means to move the locking element in another direction to release the same from the spool turning element when an unslotted portion of the wheel is engaged by the sprocket wheel, said spool turning element comprising a shaft having a reduced cylindrical portion beneath the ratchet teeth thereof, and said manually operable means for moving the locking element in another direction comprising a push button operatively connected to the locking element for disengaging the latter from the ratchet teeth of the spool turning element and bringing said locking element in the plane of the reduced cylindrical portion of said shaft.

10. In a camera, a winding spool to hold a film having a plurality of series of longitudinal marginal sprocket slots separated at intervals by unslotted portions, an element provided with ratchet teeth and operable for turning the winding spool in one direction, a normally inoperative element for engaging said ratchet teeth to lock the spool turning element, a movable sprocket wheel normally arranged to engage with the film with its teeth in the sprocket slot to permit release of said locking element and adapted to be moved by the unslotted portions of the film to cause the locking element to move in one direction to lock the spool turning element, manually operable means to move the locking element in another direction to release the same from the spool turning element when an unslotted portion of the wheel is engaged by the sprocket wheel, said spool turning element comprising a shaft having a reduced cylindrical portion beneath the ratchet teeth thereof, and said manually operable means for moving the locking element in another direction comprising a push button operatively connected to the locking element for disengaging the latter from the ratchet teeth of the spool turning element, and bringing said locking element in the plane of the reduced cylindrical portion of said shaft, and yieldable means for normally elevating the push button and the locking element whereby the latter is in position to engage the ratchet teeth of said spool turning element when moved toward the latter.

11. In a camera, a winding spool to hold a film having a plurality of series of longitudinal slots separated at intervals by unslotted portions, means for automatically winding said film upon said winding spool, means for arresting rotation of the winding spool including a member shiftable by the unslotted portions of the film to arresting position, and allowed to reversely shift to release the winding spool by means of said film slot, and yieldable means to normally urge the spool arresting means to released position.

12. An attachment for roll holding cameras to wind the film thereof and to automatically stop said film at proper intervals for exposures comprising a casing adapted to be secured to the top wall of the camera above the winding spool of the latter, a shaft section longitudinally slidable and journalled in said casing and having means upon its inner end for detachable clutching engagement with the adjacent end of said winding spool, a spring within said casing for rotating said shaft in one direction, a key longitudinally slidable and rotatable in the top of the casing and rotatable in one direction for winding said spring, means for preventing rotation of said winding key in an opposite direction, yieldable means for normally urging the winding key and the shaft in a direction away from each other, means for clutching the winding key and the shaft together upon movement of the same toward each other against the action of said yieldable means, and means for locking said shaft against turning movement under the influence of said spring for arresting winding movement of the film upon said spool.

13. An attachment for roll holding cameras to wind the film thereof and to automatically stop said film at proper intervals for exposure comprising a casing adapted to be secured to the top wall of the camera above the winding spool of the latter, a shaft section longitudinally slidable and journalled in said casing and having means upon its inner end for detachable clutching engagement with the adjacent end of said winding spool, a spring within said casing for rotating said shaft in one direction, a key longitudinally slidable and rotatable in the top of the casing and rotatable in one direction for winding said spring, means for preventing rotation of said winding key in an opposite direction, yieldable means for normally urging the winding key and the shaft in a direction away from each other, means for clutching the winding key and the shaft together upon movement of the same toward each other against the action of said yieldable means, means for locking said shaft against turning movement under the influence of said spring for arresting winding movement of the film upon said spool, said shaft locking means embodying a ratchet wheel upon the inner end portion of said shaft, a catch engageable with said ratchet wheel, and means under the influence of the film and operatively associated with the catch for causing engagement of the latter with said ratchet wheel when successive portions of the film are positioned properly for exposure.

14. An attachment for roll holding cameras to wind the film thereto and to automatically stop said film at proper intervals for exposures comprising a casing adapted to be secured to the top wall of the camera above the winding spool of the latter, a shaft section longitudinally slidable and journalled in said casing and having means upon its inner end for detachable clutching engagement with the adjacent end of said winding spool, a spring within said casing for rotating said shaft in one direction, a key longitudinally slidable and rotatable in the top of the casing and rotatable in one direction for winding said spring, means for preventing rotation of said winding key in an opposite direction, yieldable means for normally urging the winding key and the shaft in a direction away from each other, means for clutching the winding key and the shaft together upon movement of the same toward each other against the action of said yieldable means, means for locking said shaft against turning movement under the influence of said spring for arresting winding movement of the film upon said spool, said shaft locking means embodying a ratchet wheel upon the inner end portion of said shaft, a catch engageable with said ratchet wheel, and means under the influence of the film and operatively associated with the catch for causing engagement of the latter with said ratchet wheel when successive portions of the film are positioned properly for exposure, said catch being displaceable below the ratchet wheel, said shaft having an untoothed portion below said ratchet wheel, and manually operable means for displacing said catch below the ratchet wheel in the plane of said untoothed portion of the shaft.

In testimony whereof I affix my signature.

EDWARD J. QUINN.